United States Patent

Schray et al.

[11] Patent Number: 5,845,495
[45] Date of Patent: Dec. 8, 1998

[54] ARRANGEMENT FOR RECOGNIZING DIFFERENCES IN RPM BETWEEN TWO EXHAUST GAS TURBOCHARGERS

[75] Inventors: Bernhard Schray, Oberriexingen; Werner Häming, Neudenau; Michael Bäuerle, Markgröningen, all of Germany

[73] Assignee: Robert Bosch GmbH, Stuttgart, Germany

[21] Appl. No.: 952,952
[22] PCT Filed: Jan. 9, 1997
[86] PCT No.: PCT/DE97/00029
  § 371 Date: Nov. 21, 1997
  § 102(e) Date: Nov. 21, 1997
[87] PCT Pub. No.: WO97/39231
  PCT Pub. Date: Oct. 23, 1997

[30] Foreign Application Priority Data

Apr. 17, 1996 [DE] Germany .................... 196 15 033.7

[51] Int. Cl.$^6$ .................................................. F02B 37/007
[52] U.S. Cl. .................................................. 60/612
[58] Field of Search .................................................. 60/612

[56] References Cited

U.S. PATENT DOCUMENTS

| 2,199,259 | 4/1940 | Hersey | 60/612 |
| 2,359,615 | 10/1944 | Browne et al. | 60/612 |
| 5,090,204 | 2/1992 | Bonitz et al. | 60/612 |

Primary Examiner—Michael Koczo
Attorney, Agent, or Firm—Kenyon & Kenyon

[57] ABSTRACT

An arrangement enabling a reliable detection of speed-of-rotation deviations between two exhaust-gas turbochargers of an internal combustion having separate cylinder banks included a device, which determines the difference between the pressures prevailing in the two exhaust trains of the two cylinder banks upstream from the exhaust turbines and signals a relevant speed deviation when the pressure difference determined exceeds a specifiable threshold.

7 Claims, 2 Drawing Sheets

ARRANGEMENT FOR RECOGNIZING DIFFERENCES IN RPM BETWEEN TWO EXHAUST GAS TURBOCHARGERS

FIELD OF THE INVENTION

The present invention relates to an arrangement for detecting speed-of-rotation deviations between two exhaust-gas turbochargers of an internal combustion comprised of two separate cylinder banks, an exhaust train with an exhaust turbine being allocated to each cylinder bank.

BACKGROUND INFORMATION

The international Patent Application No. WO 90/03503 discloses a V-engine, which is comprised of two cylinder banks and has one exhaust-gas turbocharger for each cylinder bank. Provision is made for a boost pressure closed-loop control, which is supposed to assure that the same pressures prevail in the induction pipes of both cylinder blocks. To ensure equal pressures in both induction pipes, the speeds of rotation of the exhaust turbines arranged in the exhaust trains of the two cylinder blocks are automatically controlled as a function of the pressures measured in both induction pipes. The rotational speeds of the exhaust turbines are controlled in closed loop using bypass valves.

If a fault occurs in one of the two exhaust trains, e.g., a clogged catalytic converter, a defect in the boost-pressure controller or a malfunction of the exhaust turbine, etc., then the defect becomes noticeable because of the difference in the rotational speeds of the two exhaust-gas turbochargers. Thus, a speed deviation between the two exhaust-gas turbochargers indicates some defect, which could cause damage to one of the two exhaust-gas turbochargers.

To detect defects in a timely fashion and to avoid expensive damages resulting from the defects, there is a need to specify an arrangement for detecting the speed deviations between the two exhaust-gas turbochargers of an internal combustion engine includes two separate cylinder banks.

SUMMARY OF THE INVENTION

The device according to the present invention determines the difference between the pressures or gas masses (or volumes) prevailing in the two exhaust trains upstream from the exhaust turbines. A speed deviation between the exhaust-gas turbochargers is signaled when the difference sensed exceeds a specifiable threshold. The pressure ratios or gas masses or gas-volume ratios in the exhaust trains of the two cylinder banks give reliable evidence of whether a relevant speed deviation exists between the two exhaust-gas turbochargers.

The threshold for the measured pressure difference or the difference in the gas masses (or volumes) can be a function of the air mass (or volume) in the induction pipe or of the engine speed and/or of the load of the engine.

When a speed deviation has been recognized, various measures can be introduced to avoid greater damages on the exhaust-gas turbochargers. Either the closed-loop control system for the exhaust-gas turbochargers is interrupted and, in its place, a manipulated variable is made available, or a cylinder-selective suppression of injection is induced, or the maximum opening of the throttle valve is limited.

DETAILED DESCRIPTION OF THE DRAWINGS

Figure 1:
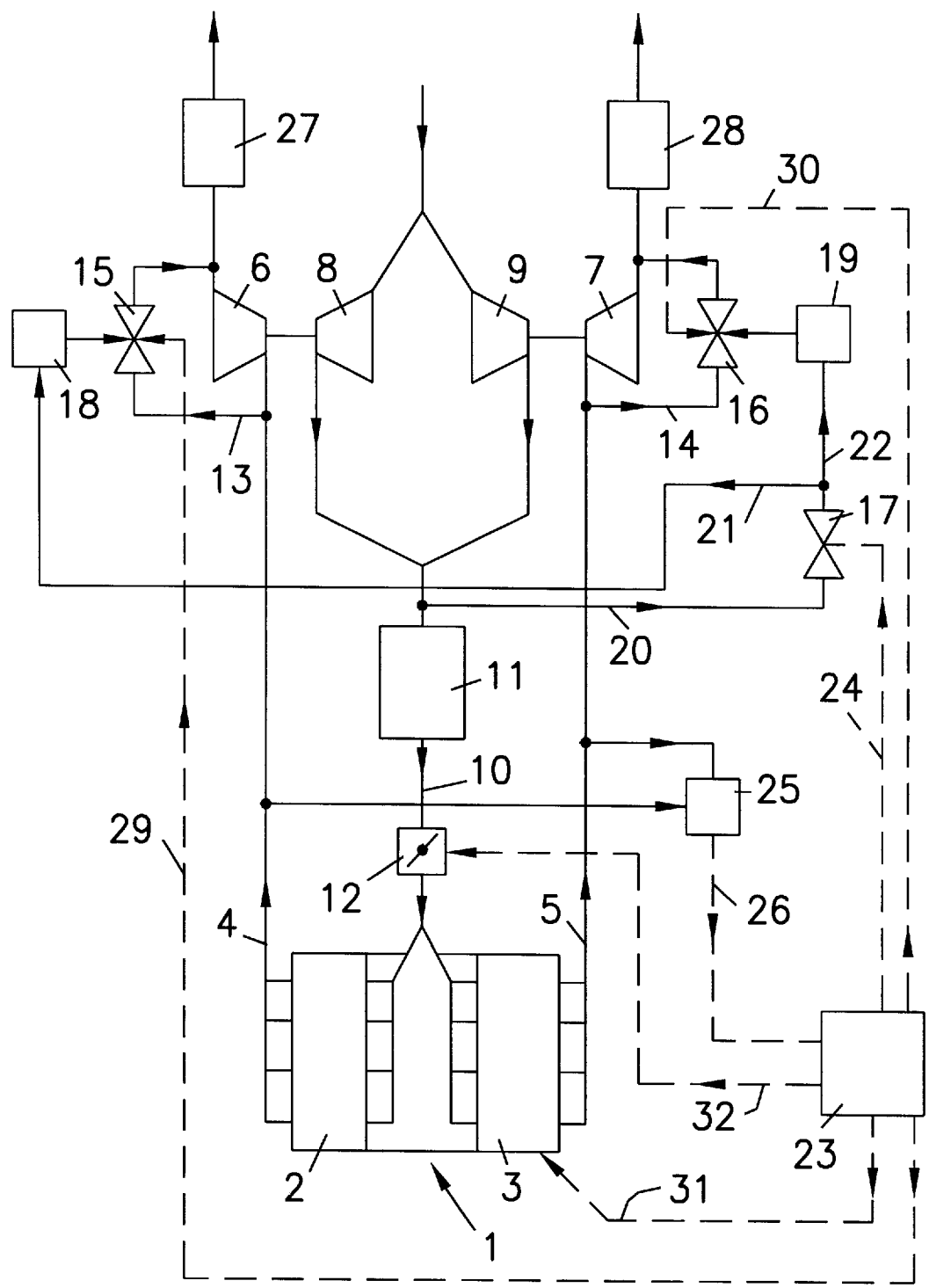
FIG. 1 shows a block diagram of an internal combustion engine having two exhaust-gas turbochargers according to the present invention.

FIG. 1 schematically shows a V-engine a boxer engine, a flat engine, or a horizontally opposed engine (1), includes two cylinder banks (2,3). Each cylinder bank (2,3) has its own exhaust train (4,5). Installed in each the exhaust train (4,5) is an exhaust turbine (6,7) of an exhaust-gas turbocharger. Exhaust turbine (6) in exhaust train (4) drives a supercharger (8), and exhaust turbine (7) in exhaust train (5) drives a supercharger (9). The two superchargers (8,9) compress the intake air in induction pipe (10), which in the shown exemplary embodiment is comprised of a pipe in which is arranged an intercooler (11) and a throttle valve (12). Downstream of throttle valve (12), induction pipe (10) branches into two cylinder banks (2,3). The shared induction pipe (10) branches to the two inlets of the two parallel connected superchargers (8,9), and the outlets of the two superchargers (8,9) merge upstream from intercooler (11). Instead of providing a shared induction pipe for the two cylinder banks (2,3), each cylinder bank (2,3) can have its own induction pipe, in which the corresponding supercharger (8,9) compresses the intake air.

Exhaust turbines (6,7) are each equipped with a bypass line (13,14). A valve (15,16) provided in bypass line (13,14) is utilized to adjust the bypass flow-through rate and, thus, the speed of exhaust turbine (6,7) and, consequently, the boost pressure produced by supercharger (8,9) in the induction pipe. To control the boost pressure in a closed or open loop, a final controlling element is provided, which in the exemplary embodiment depicted in FIG. 1 is comprised, as is generally known, of a frequency valve (17) and of a pressure element (18,19), which using a rod assembly adjusts the opening of bypass valve (15,16). Using a line (20) connected to the induction pipe, the boost pressure produced by two superchargers (8,9) is applied directly to frequency valve (17). Since there is one shared induction pipe (10), only one frequency valve (17) is required as well, whose output pressure is distributed via the two lines (21,22) equally between pressure elements (18,19) for the two exhaust-gas turbochargers. Via a line (24), frequency valve (17) receives a pulse-width-modulated control-pulse signal from a control unit (23).

A pressure sensor (25) measures the pressures prevailing in two exhaust trains (4,5) upstream from exhaust turbines (6,7) and, from these, determines the differential pressure, which it supplies as an electrical signal via a line (26) to control unit (23). A differential pressure will always arise when the speeds of the two turbochargers deviate from one another. A speed deviation occurs, for example, when pressure element (18,19) or bypass valve (15,16) or exhaust turbine (6,7) of an exhaust-gas turbocharger is defective or when a catalytic converter (27,28) located in the discharge pipe of exhaust turbine (6,7) has become clogged.

Control unit (23) compares the pressure difference prevailing in the two exhaust trains (4,5) with a specifiable threshold and does not signal a relevant speed deviation between the two exhaust-gas turbochargers until the pressure difference exceeds the threshold. A pressure difference that exceeds the threshold points to a defect in some exhaust train which can lead to greater damage to one of the two exhaust-gas turbochargers. If the speed of an exhaust-gas turbocharger decreases because of an error, the boost pressure closed-loop control would run up the speed of the other exhaust-gas turbocharger to compensate for the lack of boost pressure from the defective exhaust-gas turbocharger. However, the excessive speed could result in destruction of the exhaust-gas turbocharger.

Control unit (23) will also only signal a speed deviation between the exhaust-gas turbochargers when the pressure difference exceeds the defined threshold for a specifiable longer time, but not for just a short time, because a short-term speed deviation certainly will not yet cause any damage to one of the exhaust-gas turbochargers.

The threshold for the pressure difference can either be specified as a function of the air mass (or volume) in the induction pipe or as a function of the speed and/or of the load of the engine. The smaller the air mass (or volume) in the induction pipe, or the lower the speed or the load of the engine is, the lower the threshold is to be set, so that even smaller speed deviations between the exhaust-gas turbochargers can be detected. When it is necessary for one of the two exhaust-gas turbochargers to apply a higher boost pressure, because the other one is defective, then the exhaust-gas turbocharger that is functional is upwardly adjusted into a dangerous speed range without any special protective measure being resorted to. Thus, if the speed deviation is detected early enough, because the threshold for it is set to be lower, then one or more of the protective measures specified in the following are introduced in a timely fashion, still before the functional exhaust-gas turbocharger has been upwardly adjusted into a dangerously high speed range.

One of the mentioned protective measures provides that, in response to a detected speed deviation, control unit (23) interrupts the boost-pressure control system and supplies a manipulated variable via line (29) or (30) to bypass valve (15 or 16). The manipulated variable for bypass valve (15,16) can be drawn from a speed- and load-dependent characteristics map. In any case, the manipulated variable is so rated that exhaust turbine (6,7) remains within a harmless speed range.

A second protective measure provides that, in response to a detected speed deviation, control unit (23) induces a cylinder-selective suppression of injection via a control line (31). Suppressing injection, namely, dilutes the exhaust gas with fresh gas, which in turn decreases the enthalpy of the exhaust gas. As a result, the load level of the internal combustion engine is driven down and, accordingly, the required boost pressure is adjusted downwards. Consequently, there is no longer the danger of one of the exhaust-gas turbochargers reaching too high of a speed range.

In a third protective measure, the load level of the machine is restricted to a lower value in that, via a line (32), control unit (23) emits a control signal to limit the maximum opening of throttle valve (12).

Each of these protective measures can be taken alone, or several protective measures can be taken together. In this context, a different threshold for the differential pressure can be specified for each protective measure.

Figure 2:
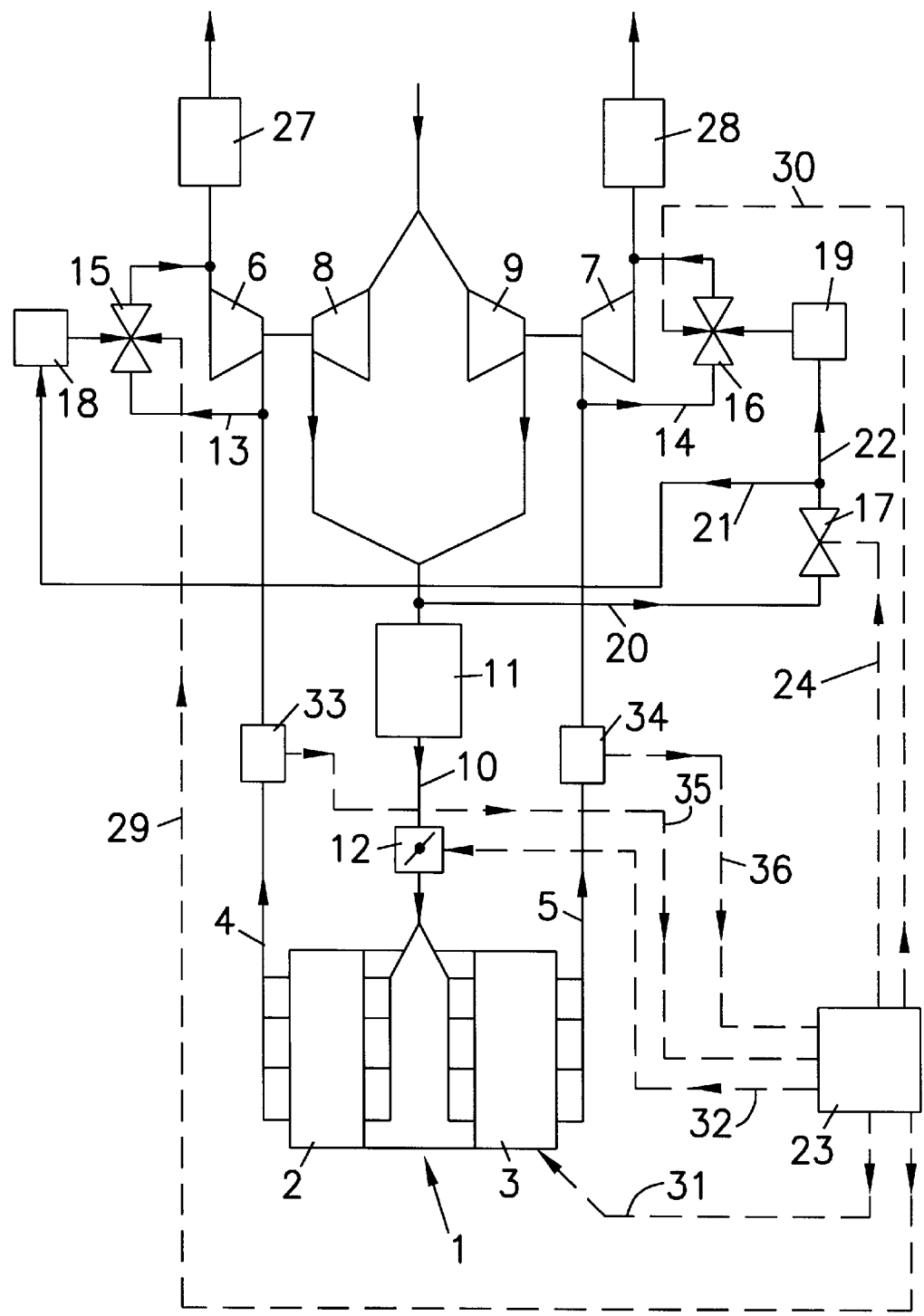
FIG. 2 shows a block diagram of an engine having two exhaust-gas turbochargers, where the gas masses (or volumes) in the two exhaust trains are measured to detect speed deviations.

Instead of drawing upon the pressure difference in the two exhaust trains (4,5) as a criterion for detecting a speed deviation between the two exhaust-gas turbochargers, as in the exemplary embodiment described above, the difference between the gas masses or volumes measured in the two exhaust trains (4,5) can also be evaluated by control unit (23) for a speed deviation. For the above described purpose, as shown in the exemplary embodiment illustrated in FIG. 2, measuring instruments (33,34) for gas masses or volumes are inserted into exhaust trains (4,5), and the output signals from the measuring instruments are provided via lines (35,36) to control unit (23). Except as mentioned above, this second exemplary embodiment is similar to the arrangement shown in FIG. 1, and uses the same reference symbols.

What is claimed is:

1. An arrangement for detecting speed-of-rotation deviations between two exhaust-gas turbochargers of an internal combustion engine, the arrangement comprising:

a first cylinder bank;

a second cylinder bank;

a first exhaust train including a first exhaust turbine provided for the first cylinder bank;

a second exhaust train including a second exhaust turbine provided for the second cylinder bank; and a device determining a difference between first and second pressures, between first and second gas masses, or between first and second gas volumes present in the first and second exhaust trains, respectively, upstream from the first and second exhaust turbines, respectively, the device indicating a speed deviation when the difference exceeds a predetermined threshold.

2. The arrangement according to claim 1, wherein the device indicates the speed deviation when the difference exceeds the predetermined threshold for a predetermined period of time.

3. The arrangement according to claim 1, wherein the predetermined threshold is a function of at least one of an air mass and an air volume in an induction pipe.

4. The arrangement according to claim 1, wherein the predetermined threshold is a function of at least one of a speed and a load of the internal combustion engine.

5. The arrangement according to claim 1, wherein the device provides a controllable variable to each of at least one boost-pressure controller in response to the speed deviation, each of the at least one boost-pressure controller being associated with a respective one of the exhaust-gas turbochargers, the controllable variable being provided as a function of a speed-dependent characteristics map and a load-dependent characteristics map.

6. The arrangement according to claim 1, wherein the device generates a cylinder-selective suppression of a fuel injection as a function of the speed deviation.

7. The arrangement according to claim 1, wherein the device generates a limitation value of a maximum opening of a throttle valve as a function of the speed deviation.

* * * * *